(12) United States Patent
Bachar et al.

(10) Patent No.: US 10,558,058 B2
(45) Date of Patent: Feb. 11, 2020

(54) DUAL VOICE COIL MOTOR STRUCTURE IN A DUAL-OPTICAL MODULE CAMERA

(71) Applicant: Corephotonics Ltd., Tel-Aviv (IL)

(72) Inventors: Gil Bachar, Tel-Aviv (IL); Ephraim Goldenberg, Ashdod (IL); Gal Avivi, Haifa (IL)

(73) Assignee: Corephontonics Ltd., Tel Aviv (IL)

( * ) Notice: Subject to any disclaimer, the term of this patent is extended or adjusted under 35 U.S.C. 154(b) by 0 days.

(21) Appl. No.: 16/368,297

(22) Filed: Mar. 28, 2019

(65) Prior Publication Data

US 2019/0227338 A1    Jul. 25, 2019

Related U.S. Application Data

(63) Continuation of application No. 15/725,901, filed on Oct. 5, 2017, now Pat. No. 10,288,897, which is a (Continued)

(51) Int. Cl.
*G02B 27/64* (2006.01)
*G02B 7/06* (2006.01)
(Continued)

(52) U.S. Cl.
CPC ............. *G02B 27/646* (2013.01); *G02B 7/06* (2013.01); *G02B 7/08* (2013.01); *G02B 7/09* (2013.01);
(Continued)

(58) Field of Classification Search
CPC ...... G02B 27/646; G02B 13/001; G02B 7/06; G02B 7/08; G02B 13/003; G02B 7/09;
(Continued)

(56) References Cited

U.S. PATENT DOCUMENTS

| 4,199,785 A | 4/1980 | McCullough et al. |
| 5,005,083 A | 4/1991 | Grage et al. |

(Continued)

FOREIGN PATENT DOCUMENTS

| CN | 101276415 A | 10/2008 |
| CN | 102739949 A | 10/2012 |

(Continued)

OTHER PUBLICATIONS

Statistical Modeling and Performance Characterization of a Real-Time Dual Camera Surveillance System, Greienhagen et al., Publisher: IEEE, 2000, 8 pages.

(Continued)

*Primary Examiner* — Gevell V Selby
(74) *Attorney, Agent, or Firm* — Nathan & Associates; Menachem Nathan

(57) ABSTRACT

Dual-optical module autofocus (AF) or AF plus optical image stabilization (OIS) cameras with reduced footprint and reduced mutual magnetic interference. Some AF+OIS cameras may include a single AF actuation assembly that moves two lens barrels in unison. Some AF cameras or AF+OIS cameras may have two AF actuation sub-assemblies and associated magnets for independent AF operation of each lens barrel, the magnets shared in a manner that cancels magnetic influences of one AF actuation sub-assembly on the other AF actuation sub-assembly, thereby allowing the two lens barrels to be positioned in close proximity, saving parts and fabrication costs.

10 Claims, 12 Drawing Sheets

Related U.S. Application Data continuation of application No. 15/117,189, filed as application No. PCT/IB2016/050844 on Feb. 17, 2016, now Pat. No. 10,015,384.

(60) Provisional application No. 62/141,875, filed on Apr. 2, 2015.

(51) Int. Cl.

| | | |
|---|---|---|
| *G03B 3/10* | (2006.01) | |
| *G03B 5/02* | (2006.01) | |
| *G03B 35/08* | (2006.01) | |
| *H04N 5/225* | (2006.01) | |
| *G02B 7/08* | (2006.01) | |
| *G02B 13/00* | (2006.01) | |
| *H02K 11/215* | (2016.01) | |
| *G02B 7/09* | (2006.01) | |
| *G03B 5/04* | (2006.01) | |
| *G03B 13/36* | (2006.01) | |
| *H02K 41/035* | (2006.01) | |

(52) U.S. Cl.
CPC .......... *G02B 13/001* (2013.01); *G02B 13/003* (2013.01); *G03B 3/10* (2013.01); *G03B 5/02* (2013.01); *G03B 5/04* (2013.01); *G03B 13/36* (2013.01); *G03B 35/08* (2013.01); *H02K 11/215* (2016.01); *H02K 41/0356* (2013.01); *H04N 5/2254* (2013.01); *H04N 5/2258* (2013.01); *G02B 13/009* (2013.01); *G03B 2205/0015* (2013.01); *G03B 2205/0069* (2013.01)

(58) Field of Classification Search
CPC ........ G02B 13/009; G03B 5/04; G03B 13/36; G03B 3/10; G03B 5/02; G03B 35/08; G03B 2205/0069; G03B 2205/0015; H02K 41/0356; H02K 11/215; H04N 5/2258; H04N 5/2254

See application file for complete search history.

(56) References Cited

U.S. PATENT DOCUMENTS

| | | | |
|---|---|---|---|
| 5,032,917 | A | 7/1991 | Aschwanden |
| 5,051,830 | A | 9/1991 | von Hoessle |
| 5,248,971 | A | 9/1993 | Mandl |
| 5,287,093 | A | 2/1994 | Amano et al. |
| 5,394,520 | A | 2/1995 | Hall |
| 5,436,660 | A | 7/1995 | Sakamoto |
| 5,444,478 | A | 8/1995 | Lelong et al. |
| 5,459,520 | A | 10/1995 | Sasaki |
| 5,657,402 | A | 8/1997 | Bender et al. |
| 5,682,198 | A | 10/1997 | Katayama et al. |
| 5,768,443 | A | 6/1998 | Michael et al. |
| 5,926,190 | A | 7/1999 | Turkowski et al. |
| 5,940,641 | A | 8/1999 | McIntyre et al. |
| 5,982,951 | A | 11/1999 | Katayama et al. |
| 6,101,334 | A | 8/2000 | Fantone |
| 6,128,416 | A | 10/2000 | Oura |
| 6,148,120 | A | 11/2000 | Sussman |
| 6,208,765 | B1 | 3/2001 | Bergen |
| 6,268,611 | B1 | 7/2001 | Pettersson et al. |
| 6,549,215 | B2 | 4/2003 | Jouppi |
| 6,611,289 | B1 | 8/2003 | Yu et al. |
| 6,643,416 | B1 | 11/2003 | Daniels et al. |
| 6,650,368 | B1 | 11/2003 | Doron |
| 6,680,748 | B1 | 1/2004 | Monti |
| 6,714,665 | B1 | 3/2004 | Hanna et al. |
| 6,724,421 | B1 | 4/2004 | Glatt |
| 6,738,073 | B2 | 5/2004 | Park et al. |
| 6,741,250 | B1 | 5/2004 | Furlan et al. |
| 6,750,903 | B1 | 6/2004 | Miyatake et al. |
| 6,778,207 | B1 | 8/2004 | Lee et al. |
| 7,002,583 | B2 | 2/2006 | Rabb, III |
| 7,015,954 | B1 | 3/2006 | Foote et al. |
| 7,038,716 | B2 | 5/2006 | Klein et al. |
| 7,199,348 | B2 | 4/2007 | Olsen et al. |
| 7,206,136 | B2 | 4/2007 | Labaziewicz et al. |
| 7,248,294 | B2 | 7/2007 | Slatter |
| 7,256,944 | B2 | 8/2007 | Labaziewicz et al. |
| 7,305,180 | B2 | 12/2007 | Labaziewicz et al. |
| 7,339,621 | B2 | 3/2008 | Fortier |
| 7,346,217 | B1 | 3/2008 | Gold, Jr. |
| 7,365,793 | B2 | 4/2008 | Cheatle et al. |
| 7,411,610 | B2 | 8/2008 | Doyle |
| 7,424,218 | B2 | 9/2008 | Baudisch et al. |
| 7,509,041 | B2 | 3/2009 | Hosono |
| 7,533,819 | B2 | 5/2009 | Barkan et al. |
| 7,619,683 | B2 | 11/2009 | Davis |
| 7,738,016 | B2 | 6/2010 | Toyofuku |
| 7,773,121 | B1 | 8/2010 | Huntsberger et al. |
| 7,809,256 | B2 | 10/2010 | Kuroda et al. |
| 7,880,776 | B2 | 2/2011 | LeGall et al. |
| 7,918,398 | B2 | 4/2011 | Li et al. |
| 7,964,835 | B2 | 6/2011 | Olsen et al. |
| 7,978,239 | B2 | 7/2011 | Deever et al. |
| 8,115,825 | B2 | 2/2012 | Culbert et al. |
| 8,149,327 | B2 | 4/2012 | Lin et al. |
| 8,154,610 | B2 | 4/2012 | Jo et al. |
| 8,238,695 | B1 | 8/2012 | Davey et al. |
| 8,274,552 | B2 | 9/2012 | Dahi et al. |
| 8,390,729 | B2 | 3/2013 | Long et al. |
| 8,391,697 | B2 | 3/2013 | Cho et al. |
| 8,400,555 | B1 | 3/2013 | Georgiev et al. |
| 8,439,265 | B2 | 5/2013 | Ferren et al. |
| 8,446,484 | B2 | 5/2013 | Muukki et al. |
| 8,483,452 | B2 | 7/2013 | Ueda et al. |
| 8,514,491 | B2 | 8/2013 | Duparre |
| 8,547,389 | B2 | 10/2013 | Hoppe et al. |
| 8,553,106 | B2 | 10/2013 | Scarff |
| 8,587,691 | B2 | 11/2013 | Takane |
| 8,619,148 | B1 | 12/2013 | Watts et al. |
| 8,803,990 | B2 | 8/2014 | Smith |
| 8,896,655 | B2 | 11/2014 | Mauchly et al. |
| 8,976,255 | B2 | 3/2015 | Matsuoto et al. |
| 9,019,387 | B2 | 4/2015 | Nakano |
| 9,025,073 | B2 | 5/2015 | Attar et al. |
| 9,025,077 | B2 | 5/2015 | Attar et al. |
| 9,041,835 | B2 | 5/2015 | Honda |
| 9,137,447 | B2 | 9/2015 | Shibuno |
| 9,185,291 | B1 | 11/2015 | Shabtay et al. |
| 9,215,377 | B2 | 12/2015 | Sokeila et al. |
| 9,215,385 | B2 | 12/2015 | Luo |
| 9,270,875 | B2 | 2/2016 | Brisedoux et al. |
| 9,286,680 | B1 | 3/2016 | Jiang et al. |
| 9,344,626 | B2 | 5/2016 | Silverstein et al. |
| 9,360,671 | B1 | 6/2016 | Zhou |
| 9,369,621 | B2 | 6/2016 | Malone et al. |
| 9,413,930 | B2 | 8/2016 | Geerds |
| 9,413,984 | B2 | 8/2016 | Attar et al. |
| 9,420,180 | B2 | 8/2016 | Jin |
| 9,438,792 | B2 | 9/2016 | Nakada et al. |
| 9,485,432 | B1 | 11/2016 | Medasani et al. |
| 9,578,257 | B2 | 2/2017 | Attar et al. |
| 9,618,748 | B2 | 4/2017 | Munger et al. |
| 9,681,057 | B2 | 6/2017 | Attar et al. |
| 9,723,220 | B2 | 8/2017 | Sugie |
| 9,736,365 | B2 | 8/2017 | Laroia |
| 9,736,391 | B2 | 8/2017 | Du et al. |
| 9,768,310 | B2 | 9/2017 | Ahn et al. |
| 9,800,798 | B2 | 10/2017 | Ravirala et al. |
| 9,851,803 | B2 | 12/2017 | Fisher et al. |
| 9,894,287 | B2 | 2/2018 | Qian et al. |
| 9,900,522 | B2 | 2/2018 | Lu |
| 9,927,600 | B2 | 3/2018 | Goldenberg et al. |
| 10,015,384 | B2 * | 7/2018 | Bachar .............. G02B 13/003 |
| 2002/0005902 | A1 | 1/2002 | Yuen |
| 2002/0030163 | A1 | 3/2002 | Zhang |
| 2002/0063711 | A1 | 5/2002 | Park et al. |
| 2002/0075258 | A1 | 6/2002 | Park et al. |
| 2002/0122113 | A1 | 9/2002 | Foote |

(56) References Cited

U.S. PATENT DOCUMENTS

| | | |
|---|---|---|
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0117316 A1 | 5/2008 | Orimoto |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0238327 A1 | 9/2010 | Griffith et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2012/0026366 A1 | 2/2012 | Golan et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0093842 A1 | 4/2013 | Yahata |
| 2013/0135445 A1 | 5/2013 | Dahi et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0092066 A1 | 4/2015 | Geiss et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0271471 A1 | 9/2015 | Hsieh et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0024329 A1 | 1/2018 | Goldenberg et al. |
| 2018/0120674 A1 | 5/2018 | Avivi et al. |
| 2018/0150973 A1 | 5/2018 | Tang et al. |
| 2018/0241922 A1 | 8/2018 | Baldwin et al. |
| 2018/0295292 A1 | 10/2018 | Lee et al. |

FOREIGN PATENT DOCUMENTS

| | | |
|---|---|---|
| CN | 103024272 A | 4/2013 |
| CN | 103841404 A | 6/2014 |
| EP | 1536633 A1 | 6/2005 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2003298920 A | 10/2003 |
| JP | 2004133054 A | 4/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2013106289 A | 5/2013 |
| KR | 20090058229 A | 6/2009 |

(56) References Cited

FOREIGN PATENT DOCUMENTS

| KR | 20100008936 A | 1/2010 |
|---|---|---|
| KR | 20140014787 A | 2/2014 |
| KR | 101477178 B1 | 12/2014 |
| KR | 20150118012 A | 10/2015 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7 μm Pixels in 0.11 μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: EuroGraphics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.

\* cited by examiner

DUAL VOICE COIL MOTOR STRUCTURE IN A DUAL-OPTICAL MODULE CAMERA

CROSS REFERENCE TO RELATED APPLICATIONS

This application is a continuation application of U.S. patent application Ser. No. 15/725,901 filed Oct. 5, 2017 (now allowed), which was a continuation application of U.S. patent application Ser. No. 15/117,189 filed Aug. 6, 2016 (now U.S. Pat. No. 10,015,384), which was a 371 application from international patent application PCT/IB2016/050844, and is related to and claims priority from U.S. Provisional Patent Application No. 62/141,875 filed Apr. 2, 2015 and having the same title, which is incorporated herein by reference in its entirety.

FIELD

Embodiments disclosed herein relate in general to dual or multi-voice coil motor (VCM) structures and in particular to dual-VCM structures used in miniature dual-optical or more module cameras.

BACKGROUND

A compact (miniature) dual-optical module camera (also referred to as "dual-aperture camera", "dual-lens camera" or simply "dual-camera"), as e.g. in a smart-phone, can be used in conjunction with appropriate computational photography algorithms for several purposes. These include achieving advanced digital zoom, lowering total module height while keeping high performance, improving low-light performance and creating depth maps. In order to simplify the computational photography algorithms and thus reduce time and errors, it is required that the two cameras be set as closely proximate as possible. In compact camera modules, the most ubiquitous form of achieving auto-focus (AF) and/or optical image stabilization (OIS) is by actuating (shifting) an imaging lens (or simply "lens") module of the camera with respect to the camera sensor(s). The most common actuator type in such cameras is the voice coil motor (VCM). A VCM actuator includes coils, fixed (also referred to as "permanent" or "hard") magnets and springs. When current is driven through a coil, an electro-magnetic (EM) Lorentz force is applied on it by the magnetic field of the magnets and the lens module changes position. The EM force is balanced against the springs to achieve the required position.

In dual-aperture photography, two camera modules enable taking two images of the same scene simultaneously. Each camera may include one or more VCM (or other magnetic) actuator(s) for AF and OIS purposes. When using VCM actuators, the two VCM actuators are positioned in close proximity. The two camera modules may have identical or different optical elements (lens modules/lenses). Each VCM actuator needs then to actuate its respective lens module according to the optical demands. Each VCM actuator needs to operate separately, preferably as if it were not coupled magnetically to the other VCM actuator (i.e. as if it were a standalone module).

Two VCM actuators in close proximity may interfere with each other's magnetic field and may not work properly. This interference limits the minimal distance between the actuators and/or requires unique magnetic structures and changes to the VCM. A small distance is advantageous for minimizing camera footprint and for simplifying computational photography algorithms and calculations, because it results in smaller parallax.

Known solutions to the proximity problems posed by miniaturized dual-optical module cameras include use of off-the-shelf actuators and some means for magnetic shielding (see e.g. PCT patent application PCT/IB2014/062181). The latter limits the proximity achievable in the positioning of two actuators in a single camera. Another solution includes a VCM that houses two lenses that move together (see e.g. PCT patent application PCT/IB2014/062854).

There is therefore a need for, and it would be advantageous to have ways to construct a magnetically stable structure that can house two lens modules in close proximity to each other, and actuate each lens barrel in an independent way for AF purposes. In addition there is a need for an OIS mechanism coupled to such a structure.

SUMMARY

In various embodiments there are disclosed multi-optical module AF or AF+OIS imaging devices (cameras) and in particular dual-optical module cameras, each dual-optical module camera having two AF actuation sub-assemblies, the cameras having improved VCM magnetic design, reduced part numbers and reduced footprint. In each such camera, magnets provided for the two AF actuation sub-assemblies are shared in a manner that allows two lens modules to be assembled in very close proximity, removing the need for a magnetic shield therebetween.

Hereinafter, the term "lens" is used instead of "imaging lens" for simplicity.

In an exemplary embodiment, there is provided an imaging device comprising: a first lens module having a first optical axis and including a first lens carrier with a first lens carrier external surface, the first lens carrier having a first coil wound around at least part of the first lens carrier external surface; a second lens module having a second optical axis parallel to the first optical axis and including a second lens carrier with a second lens carrier external surface, the second lens carrier having a second coil wound around at least part of the second lens carrier external surface; a first plurality of magnets surrounding the first coil, and a second plurality of magnets surrounding the second coil, wherein the first and second pluralities of magnets share at least one common magnet, and wherein each of the first and second plurality of magnets is associated with an auto-focus actuation of the respective lens module.

In an exemplary embodiment, the magnets of the first plurality have north poles pointing toward the first optical axis and the magnets of the second plurality have south poles pointing toward the second optical axis. Exemplarily, the first and second pluralities of magnets may include a combined total of four to seven magnets. The magnets may exemplarily be rigidly coupled to a frame. Each lens carrier and associated coil may move relative its respective plurality of magnets and the frame, wherein the movement of each lens carrier and its associated coil is independent of the movement of the other lens carrier and its associated coil.

In some exemplary embodiments, an imaging device may further comprise a board having attached thereto a plurality of OIS coils, each OIS coil associated with at least one of the magnets from the first or second plurality of magnets, wherein the frame is movable relative to the board in a plane substantially perpendicular to both optical axes as a result of magnetic forces developing between at least some of the OIS coils and their respective associated magnets when a current is passed in respective OIS coils. A position sensing mechanism that exemplarily includes at least one Hall bar may be used for sensing motion in a plane perpendicular to each optical axis and/or for sensing roll motion around an optical axis. The sensing of position in one direction is independent of the sensing of position in another direction.

In an exemplary embodiment, there is provided an imaging device comprising: a first lens module having a first optical axis; a second lens module having a second optical axis parallel to the first optical axis; a lens carrier housing the first and second lens modules, the lens carrier having an external carrier surface with a coil wound around at least part of the external carrier surface; a plurality of magnets surrounding the coil; and a housing frame for housing the plurality of magnets, the housing frame hung by springs above a board having attached thereto a plurality of OIS coils, each OIS coil associated with at least one of the magnets, wherein the housing frame is movable relative to the board in a plane substantially perpendicular to both optical axes as a result of magnetic forces developing between at least some of the coils and their associated magnets when a current is passed in respective OIS coils, and wherein the first and second lens modules are configured to undergo simultaneous auto-focusing operations.

A position sensing mechanism that exemplarily includes at least one Hall bar may be used for sensing motion in a plane perpendicular to each optical axis and/or for sensing roll motion around an optical axis. The sensing of position in one direction is independent of the sensing of position in another direction.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure may be labeled with a same numeral in the figures in which they appear. The drawings and descriptions are meant to illuminate and clarify embodiments disclosed herein, and should not be considered limiting in any way.

DETAILED DESCRIPTION

All figures described next are drawn in a three axis (X-Y-Z) reference frame in which the axes are defined as follows: the Z axis is parallel to the optical axes of two lens modules and perpendicular to the surface of camera sensors. The Y axis is perpendicular to the optical axes of the two lenses and parallel to the camera sensor surfaces. The Y axis is also perpendicular to the shortest line connecting the optical axes of the two lens modules. The X axis is perpendicular to the optical axes of the two lenses, parallel to the camera sensor surfaces and parallel to the shortest line connecting the optical axes of the two lenses.

Figure 1A:
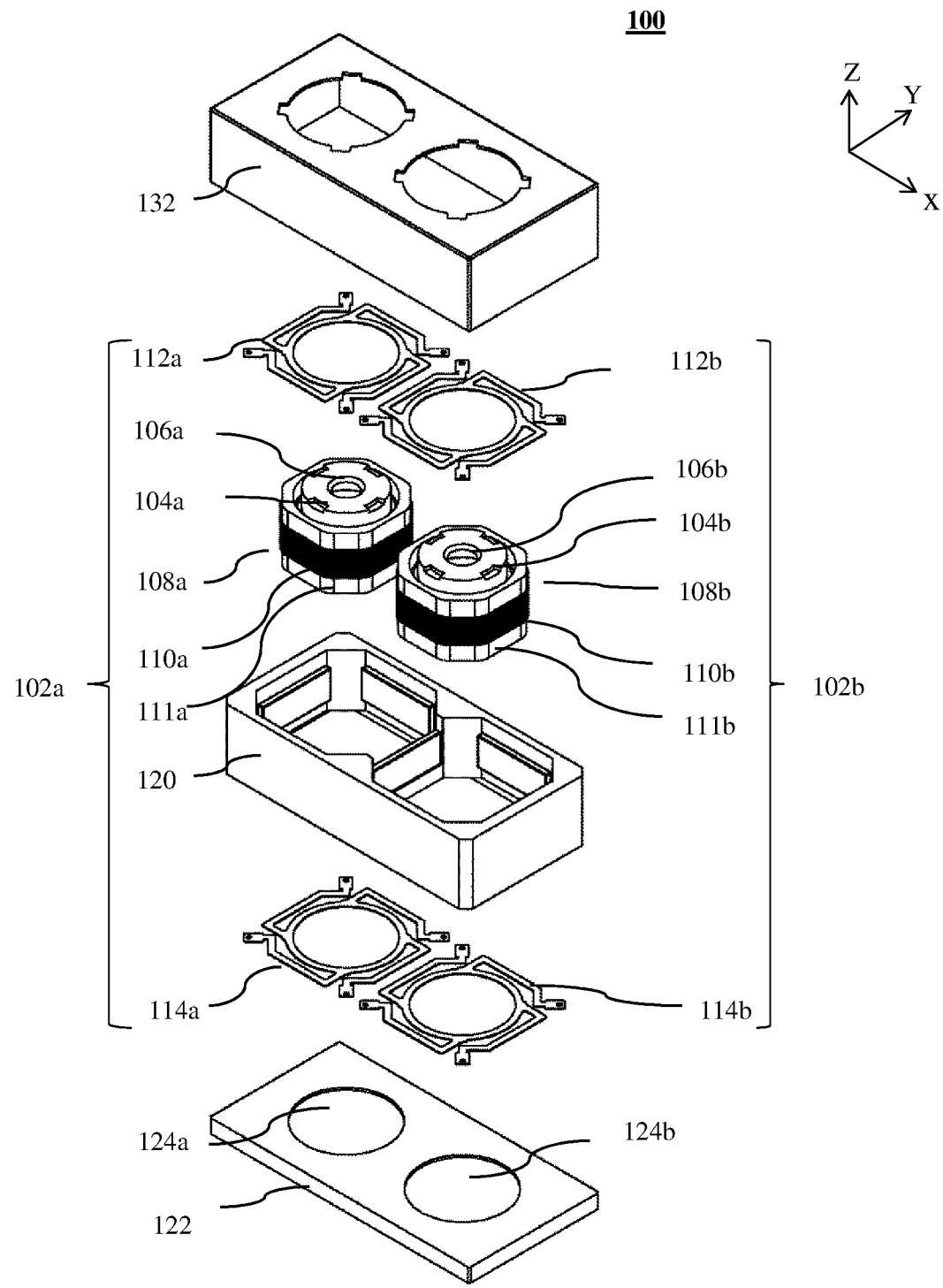
FIG. 1A shows schematically an exploded view of embodiment of a dual-aperture camera having a dual VCM AF actuator disclosed herein.
Figure 1B:
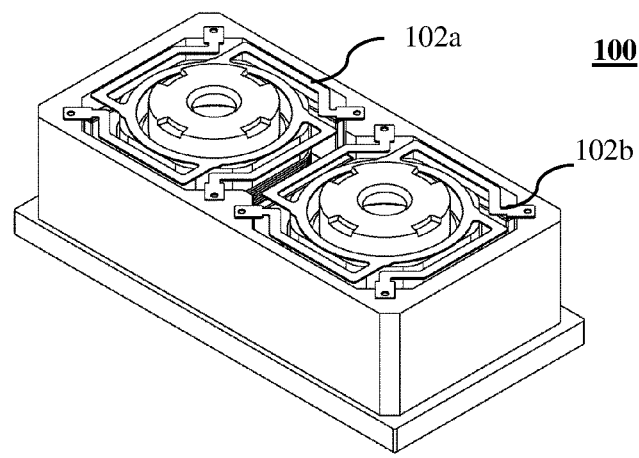
FIG. 1B shows an isometric view of the camera of FIG. 1A.
Figure 1C:
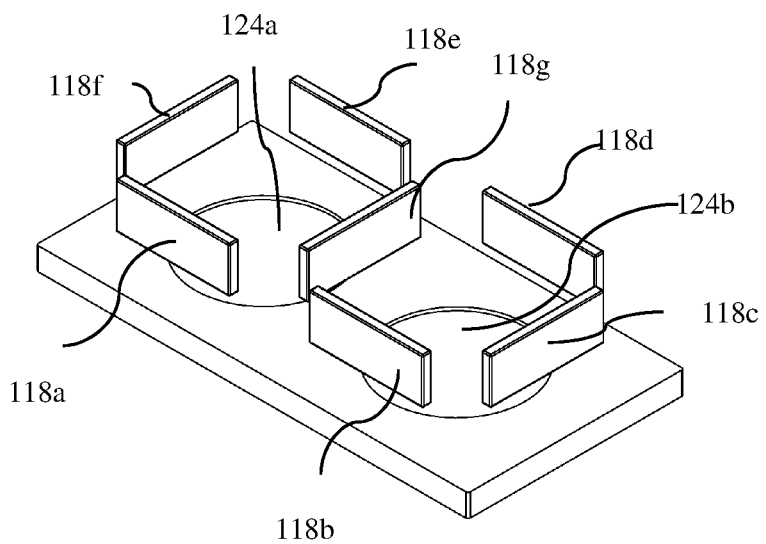
FIG. 1C shows an isometric view of a first magnet set embodiment with seven magnets in the camera of FIG. 1B.
Figure 1D:
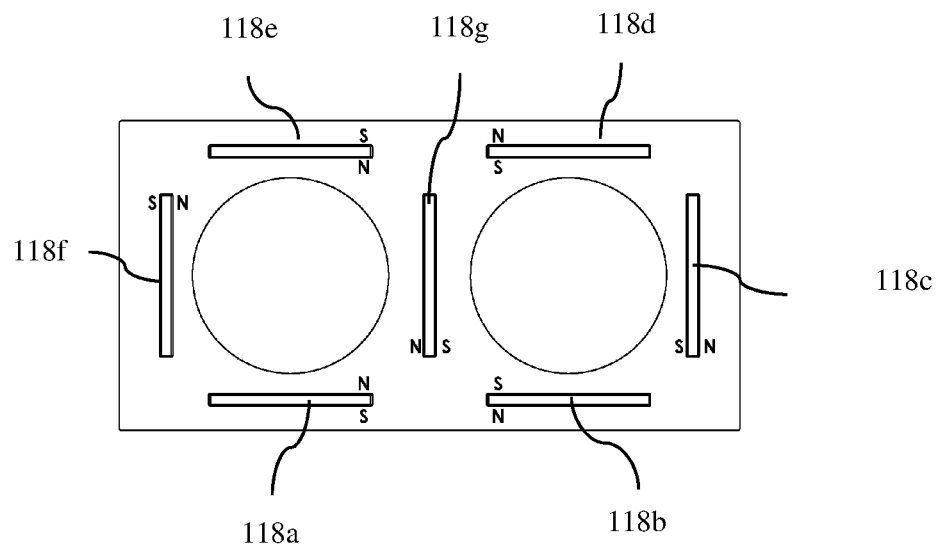
FIG. 1D shows a top view of the seven magnets of the embodiment in FIG. 1C and associated pole directions.

FIG. 1A shows schematically an exploded view of embodiment 100 of a dual-optical module camera having a dual-VCM AF actuator disclosed herein. FIG. 1B shows camera 100 in an isometric view, FIG. 1C shows an isometric view of a magnet set embodiment with seven magnets, and FIG. 1D shows a top view of the seven magnets of the embodiment in FIG. 1C and associated pole directions.

Dual-optical module camera 100 includes two AF actuation sub-assemblies 102a and 102b. Each AF actuation sub-assembly includes an optical lens module, respectively 104a and 104b, each lens module including a lens element, respectively 106a and 106b, optically coupled to a respective image sensor (not shown but described below). Each lens module may have dimensions as follows: a diameter in the range 6-7 mm, a height of about 4 mm and a fixed focal length in the range of 4-8 mm. The two lens barrels may be identical or may be different in some parameters such as focal length, diameter and F#. Each lens barrel is housed in a separate lens carrier, respectively 108a and 108b. The lens carriers are typically (but not necessarily) made of a plastic material. Each lens carrier has a coil (respectively 110a and 110b) wound around at least part of an external carrier surface (respectively 111a and 111b). The coil is typically made from copper wire coated by a thin plastic layer (coating) having inner/outer diameters of respectively in the range of 50-60 μm, with several tens of turns per coil such that the total resistance is typically on the order of 10-30 ohms per coil.

Each AF actuation sub-assembly further includes a spring set, each spring set including two (upper and lower) springs. Thus, a first spring set of actuation sub-assembly 102a includes an upper spring 112a and a lower spring 114a, while a second spring set of sub-actuation assembly 102b includes an upper spring 112b and a lower spring 114b. Springs 112a, 112b, 114a, 114b may all be identical, as shown in this embodiment. In other embodiments, they may vary in shape, spring constants, dimensions and materials. Each set of springs acts a single linear rail that suspends the AF actuation sub-assembly. The linear rail is typically flexible in one direction of motion, namely along the Z axis (optical axis of the suspended lens), with a typical stiffness of 20-40 N/m, and is very stiff along the other two axes of motion, namely in the X-Y plane (or perpendicular to the optical axis of the suspended lens), with a typical stiffness >500 N/m.

Camera 100 further includes a set of seven magnets (numbered 118a-g), all housed (glued) in a single plastic or metallic frame 120. Frame 120 encases magnets 118a-g. Magnets 118a-g may all be identical, as in this embodiment. In other embodiments, they may vary in shape, magnetic field, dimensions and materials. The magnets arrangement is described in detail below. The spring sets of the two actuation sub-assemblies are hung on frame 120 and allow motion as described above. The two AF actuation sub-assemblies, the frame and the seven magnets form a "combined" actuation assembly referred to hereinafter as a "dual-AF-actuation" assembly.

Frame 120 is fixed onto a base 122, by glue or other means, normally made of a plastic material. Base 122 includes openings (round holes) 124a and 124b for two image sensors (not shown). The image sensors are typically rectangular, with diagonal length in the range of ¼" to ½". The image sensors may be identical or different in size, type of sensing mechanism, etc. Each of the sensors is positioned just below of the two actuation sub-assemblies 102a and 102b on a printed circuit board ("PCB"—not shown) and acquires a respective image in a known fashion. The actuation (motion) of the actuation sub-assemblies in the Z direction allows focusing of the light coming from images at various distances from the camera on the image sensors. Finally, camera 100 includes a shield 132, typically made from stainless steel, which protects all components included therein for mechanical damage, dust and stray light.

Figure 1E:
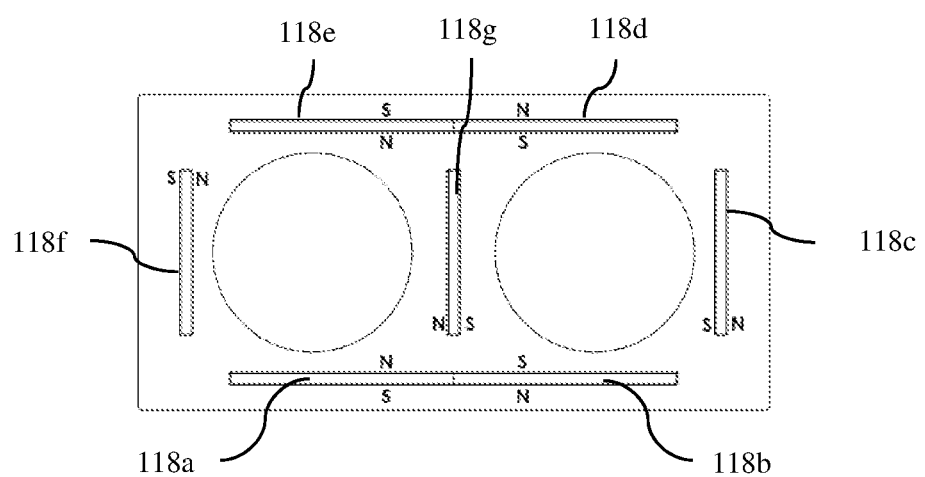
FIG. 1E shows a top view of another magnet set embodiment with five magnets and associated pole directions in a camera embodiment as in FIG. 1A.

FIG. 1E shows a top view of another magnet set embodiment in which magnets 118a+118b and 118d+118e are joined (e.g. sintered) with poles as shown, essentially reducing the number of magnets from seven to five. Such "joined" magnets are known in the art, and described for example in PCT patent application WO2014/100516A1.

Figure 2A:
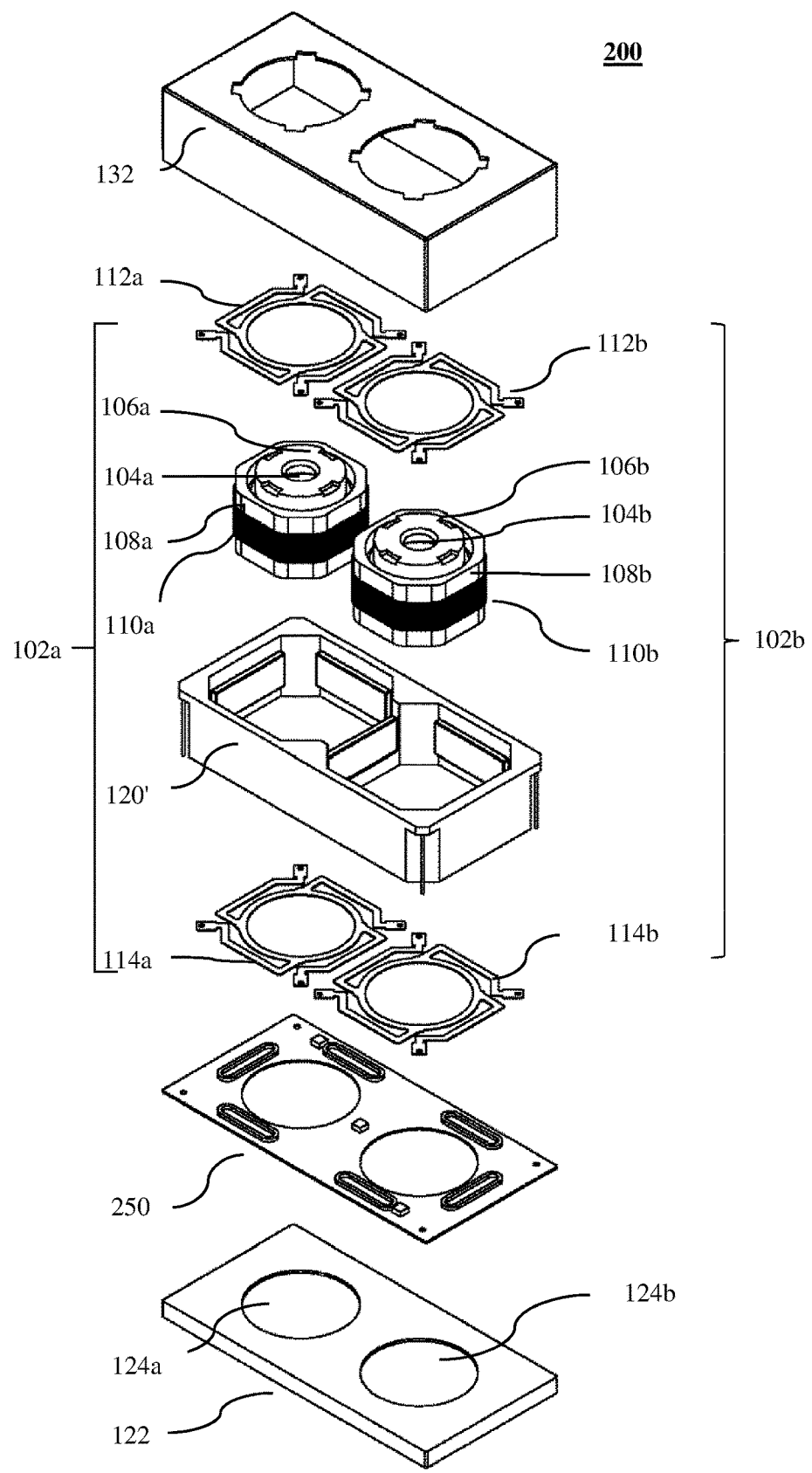
FIG. 2A shows schematically an exploded view of embodiment of a dual-optical module camera having a dual VCM AF+OIS actuator disclosed herein.
Figure 2B:
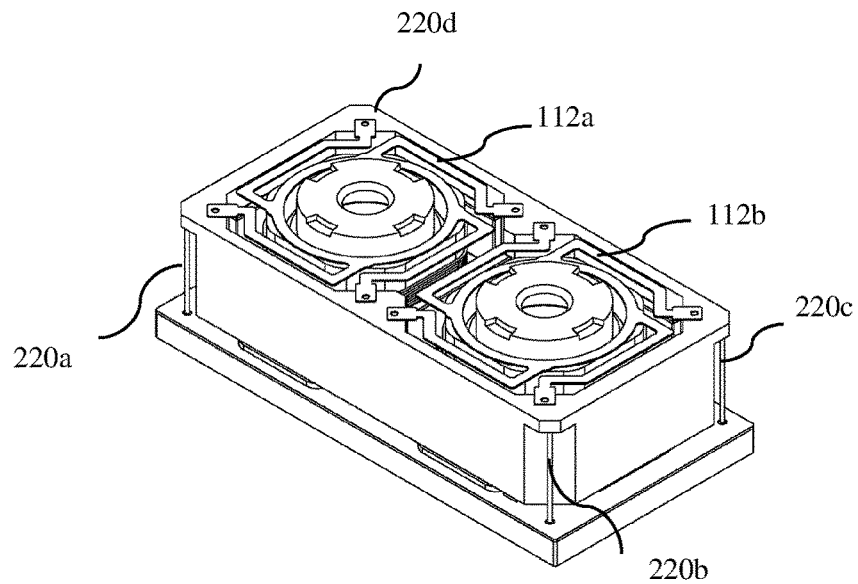
FIG. 2B shows an isometric view of the camera of FIG. 2A.
Figure 2C:
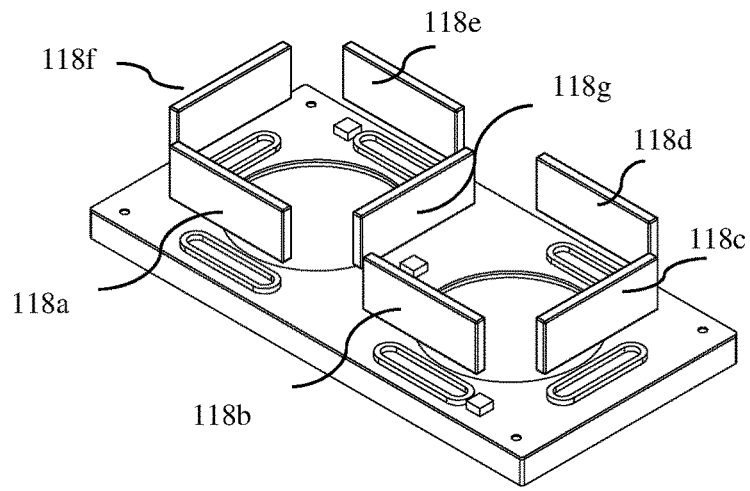
FIG. 2C shows an isometric view of a first magnet set embodiment of seven magnets in the camera of FIG. 2B.
Figure 2D:
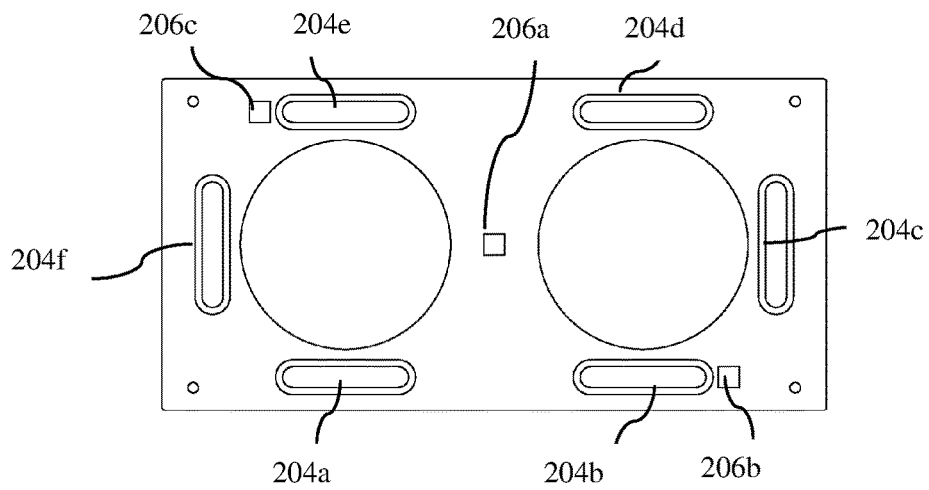
FIG. 2D shows a top view of six coils under the seven magnets of the embodiment in FIG. 2C.
Figure 2E:
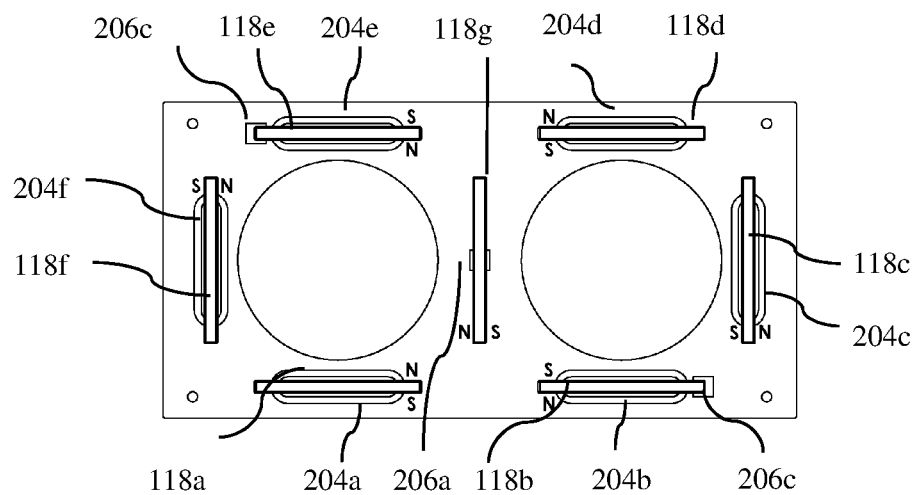
FIG. 2E shows a top view of the seven magnets of the embodiment in FIG. 2C on top of the six coil, and associated magnet pole directions.

FIG. 2A shows schematically an exploded view of embodiment 200 of a dual-optical module camera having a combined dual VCM AF and OIS actuator. FIG. 2B shows camera 200 in an isometric view, FIG. 2C shows an isometric view of a magnet set embodiment with seven magnets. FIG. 2D shows a top view of six coils under the seven magnets. FIG. 2E shows a top view of the seven magnets on top of the six coils and associated magnet pole directions.

Camera 200 includes all the components of camera 100 as well as additional components, with differences as follows: in camera 200, a frame 120' is not fixed onto base 122 but is rather suspended on a suspension spring system comprising four springs 220a, 220b, 220c and 220d (FIG. 2B). The springs are typically made of thin round wires and form a suspension mechanism known in the art, see e.g. co-owned U.S. patent application Ser. No. 14/373,490 to Corephotonics Ltd. This mechanical structure is further analyzed below. In some embodiments, other types of springs (e.g. of rectangular cut or oval) may be used. In some embodiments, more than four springs may be used. Camera 200 further includes OIS motion coils 204a-f positioned on a PCB 250 which is glued on base 122. Coils 204a-f are positioned under respective magnets 118a-e and apply a Lorentz force on the respective magnets. Camera 200 further includes sensing elements (e.g. Hall bars) 206a-c (FIG. 2C) that can measure a magnetic field and indicate the position of the dual-AF-actuation assembly, for example as in US 20140327965A1. Such a motion in the X-Y plane allows performance of OIS, by compensating for hand movements that shift and tilt the camera module with respect to the object to be captured, as known in the art.

Coils 204a-f may be operated in various actuation modes. In some such actuation modes, currents are directed through only some of the coils. In some actuation modes, current are directed through all of the coils. As explained below, in all modes of operation there is a complete decoupling between different modes of motion, namely the two Z-direction motions of the two lenses relative to frame 120 (or 120') and the X-Y motion of frame 120' relative to the base.

Figure 2F:
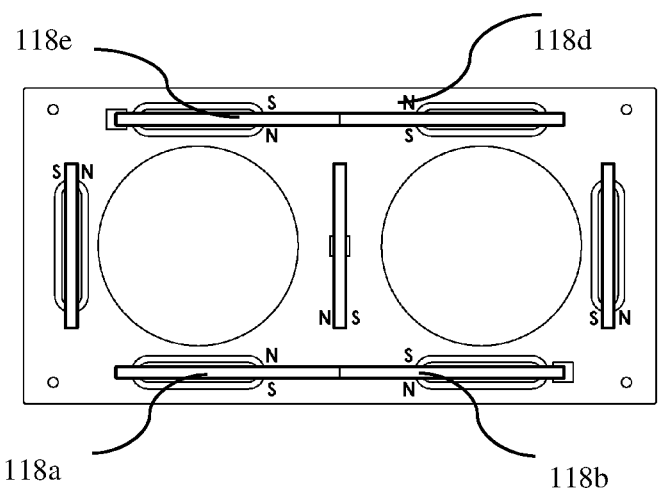
FIG. 2F shows a top view of another magnet set embodiment with five magnets and associated pole directions in a camera embodiment as in FIG. 2A.

FIG. 2F shows a top view of another magnet set embodiment in which magnets 118a+118b and 118d+118e are joined (e.g. sintered) with poles as shown, essentially reducing the number of magnets from seven to five.

Four-Wire Spring Mechanical Structure

A mechanical structure consisting of four round wires is typically used for in-plane motion in OIS mechanisms, see e.g. co-owned U.S. patent application Ser. No. 14/373,490 to Corephotonics Ltd. For wires with typical diameter ranges of 50-100 μm typically made from metal (for example: stainless-steel alloy) and carrying a dual AF-actuation assembly with a total mass of 0.5-1 gram, the following typical modes of motion are created:

| Motion mode | Typical spring constant range | Typical frequency range |
| --- | --- | --- |
| X | 40-60 N/m | 30-60 Hz |
| Y | 40-60 N/m | 30-60 Hz |
| Z | ~250000 N/m | ~3000-4000 Hz |
| Roll around X | ~5 N * m/rad | ~5000-6000 Hz |
| Roll around Y | ~1.25 N * m/rad | ~3000-4000 Hz |
| Roll around Z | ~0.001 N * m/rad | ~60-100 Hz |

For motion in three modes, the X mode, the Y mode and the "roll around Z" mode, the typical frequency range is much lower than for the other three modes. The physical meaning of this fact is that motion in Z mode, roll around X mode and roll around Y mode are much stiffer and are unlikely to occur under low forces like those that exist in the system (order of 0.01N).

As explained above, motion in the X-Y plane allows OIS performance. In the cases known in the art of a single aperture camera module (for example in PCT/IB2014/062181), a roll motion around the Z (optical) axis will not influence the image, since lens modules are axis-symmetric around this axis. In the cameras disclosed herein, a roll around the Z axis may cause distortion or shift the image, and is thus unwanted. Therefore, a cancellation method provided herein for this mode is disclosed below.

Electrical Connectivity

Two wire electrical connections are needed per coil, for current input and output, for each coil in the embodiments demonstrated. For camera 100 and for the moving coils 110a and 110b in the of two AF actuation sub-assemblies, is it desired that the electrical connections not add any external limitation (i.e. external forces, friction, etc.) on the moving structure. As in typical cases (see for example patent WO2014/100516A1), springs 112a-b and 114a-b can convey the current. In an embodiment, springs 112a and 114a may convey the current for coil 110a (in and out, respectively), while springs 112b and 114b may convey the current for coil 110b (in and out, respectively). In an embodiment, spring 112a may be split to two halves, such that mechanically it serves as a single spring while each half serves as a single electrical connection for coil 110a. Similarly, spring 112b may be split to two halves, such that mechanically it serves as single spring, while each half serves as a single electrical connection for coil 110b.

For camera 200, currents are needed to be further conveyed from the moving AF assembly to the stationary base 122. Springs 220a-d may serve for this purpose as follows: springs 220a and 220d may convey currents from AF actuation sub-assembly 102a to base 122, while springs 220b and 220c may convey currents from AF actuation sub-assembly 102b to base 122.

Magnetic and Mechanical Analysis

The VCM force mechanism is based on Lorentz's law. The Lorentz force is known to be equal to:

$$F = I \int d\vec{l} \times B$$

where I is the current in the coil, B is the magnetic field, and $d\vec{l}$ is a wire element. Thus, only a magnetic field perpendicular to the wire creates force in the desired motion direction. The magnetic field term in the Lorentz force equation is applied on the wire by the permanent magnets. In addition, from Newton's third law of force, an equal but opposite force is applied on the permanent magnet by the coils.

Attention is now drawn to FIG. 1C and FIG. 2C, where only the elements active in the magnetic circuits appear. The poles of each of the magnets are arranged as indicated in FIGS. 1C-1D (2C-2D). Namely, the north pole is toward the positive Y direction for magnets 118a and 118d, toward the negative Y direction for magnets 118b and 118e the north pole, toward the positive X direction for magnets 118c and 118f, and toward the negative X direction for magnet 118g.

It can be seen that for actuation sub-assembly 102a (and in particular for coil 110a), the north magnetic poles are positioned inward, making the magnetic field flow inward. The first actuation mode to be analyzed is the actuation mode related to motion in the Z axis. If a current in coil 110a flows in a counter clockwise direction, according to Lorentz's law a force in the positive Z direction will be applied on coil 110a and thus on the lens carrier 108a and lens 106a attached thereto. This force is independent and does not affect actuation sub-assembly 102b, i.e. coil 110b, lens carrier 108b or lens 106b. In the same manner, it can be seen that for actuation sub-assembly 102b (and in particular coil 110b), the magnetic field flows outward. Thus, if a current in coil 110b flows in a clockwise direction, according to Lorentz's law a force in the positive Z direction will be applied on the coil, and thus on the lens carrier 108b and lens 106b attached thereto. This force is independent and does not affect actuation sub-assembly 102a (coil 110a, lens carrier 108a or lens 106a).

Figure 3A:
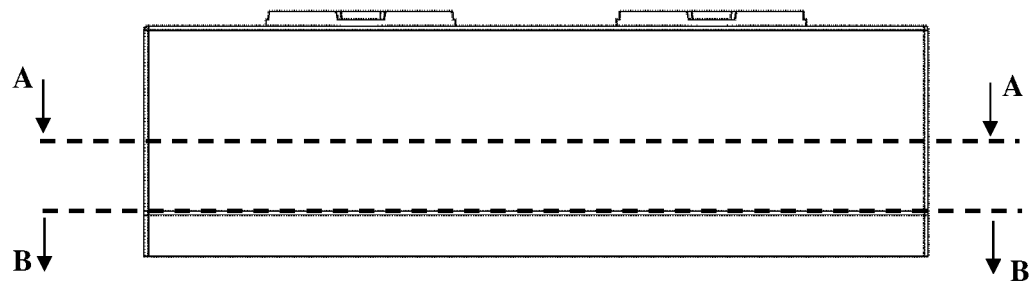
FIG. 3A shows cross sections A-A and B-B in a dual-optical module camera disclosed herein.
Figure 3B:
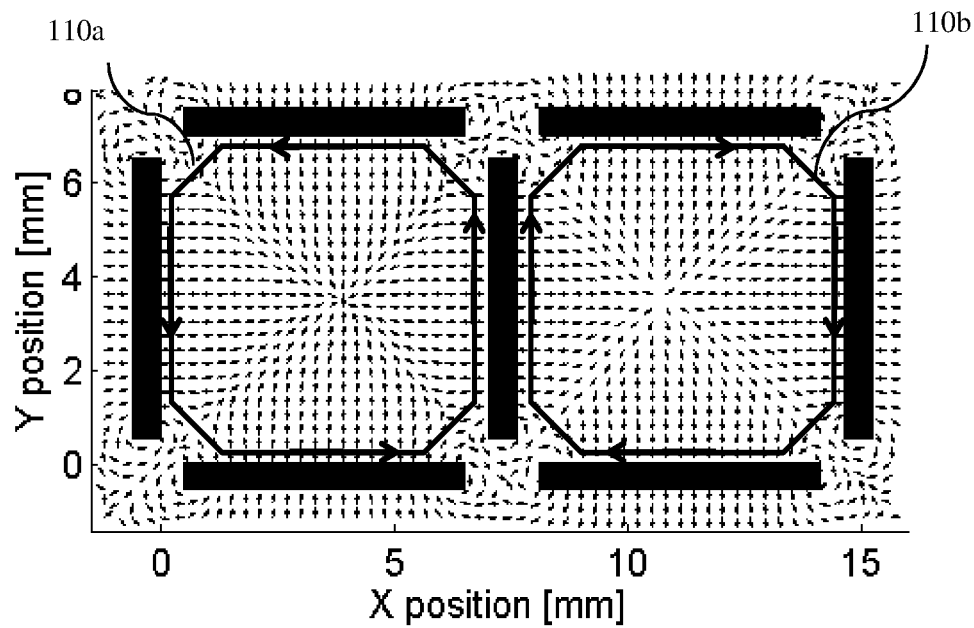
FIG. 3B shows results of a simulation of the magnetic field in the X-Y plane in a dual-optical module camera along cross section A-A.

FIG. 3A shows cross sections A-A and B-B in a dual-optical module camera disclosed herein. FIG. 3B shows results of a simulation of the magnetic field in the X-Y plane along cross section A-A in FIG. 3A, explaining the magnetic forces acting in the AF part of the actuator. Coils 110a and 110b are also indicated, as is the direction of current in the coils (counter-clockwise in coil 110a, clockwise in coil 110b). In this simulation (and the simulation to follow below) we assume magnets with dimensions of 6 mm×1.3 mm×0.6 mm, made from neodymium with magnetic coercively $H_{ci}$=750 kA/m.

As shown, looking at the cross product dl×B on all parts of coil 110a and assuming a counter-clockwise direction of current, the force acting on all parts of the coil is in the positive Z direction (away from the camera sensor). In order to reverse the force direction, the current in coil 110a can be reversed (to be clockwise). For coil 110b, assuming a clockwise direction of current, the force acting on all parts of the two coils is in the positive Z direction (away from the camera sensor). In order to reverse the force direction, the current in coil 110b can be reversed (to be counter-clockwise).

Figure 4A:
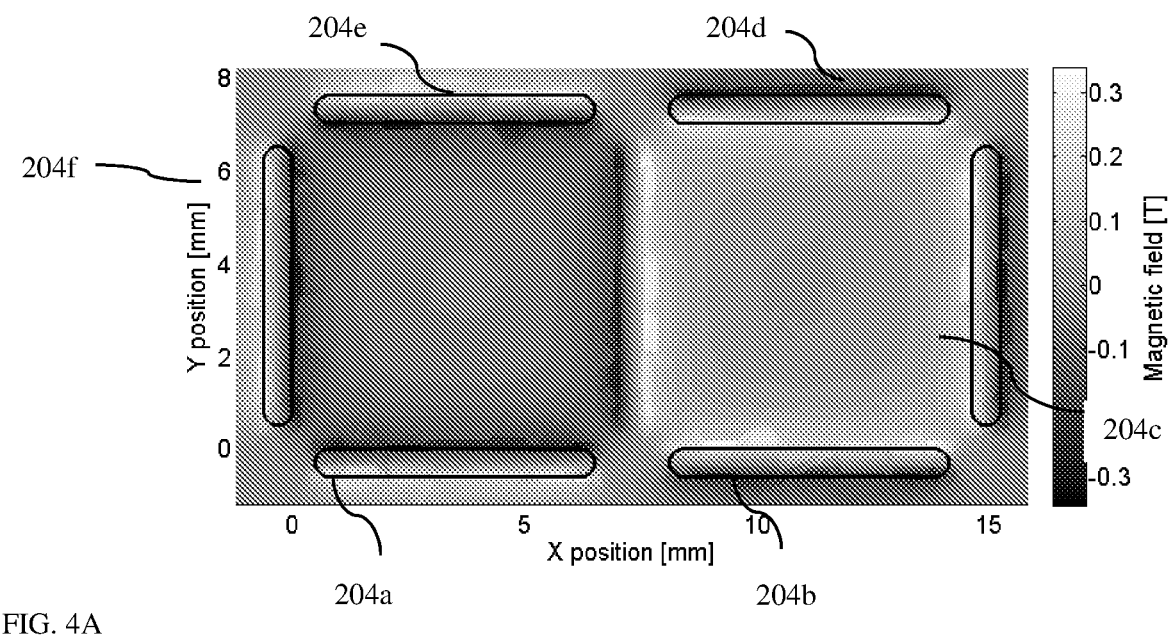
FIG. 4A shows results of a simulation of the magnetic field in the X-Y plane in a dual-optical module camera along cross section B-B.
Figure 4B:
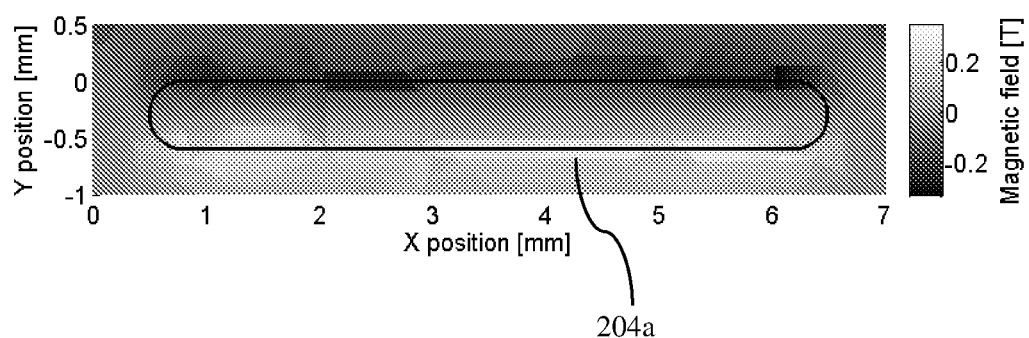
FIG. 4B shows a magnification of an area in FIG. 4A.

Moving to the second and third actuation modes (X-Y plane) used for OIS, FIG. 4A shows simulation results of the magnetic field along section B-B of FIG. 3A. FIG. 4A shows the magnetic field in the Z direction in the X-Y plane, with indication to the position of coils 204a-f. FIG. 4B shows an enlarged view of the lower left section in FIG. 4A, in the vicinity of coil 204a. In FIGS. 4A and 4B, the X and Y axes indicate the position in X-Y plane in mm, whereas the shade of gray indicates the strength of the magnetic field in the Z direction. The shade scale in the two images, which corresponds to the magnetic field strength, is indicated by the bar on the right of each figure.

Figure 5:
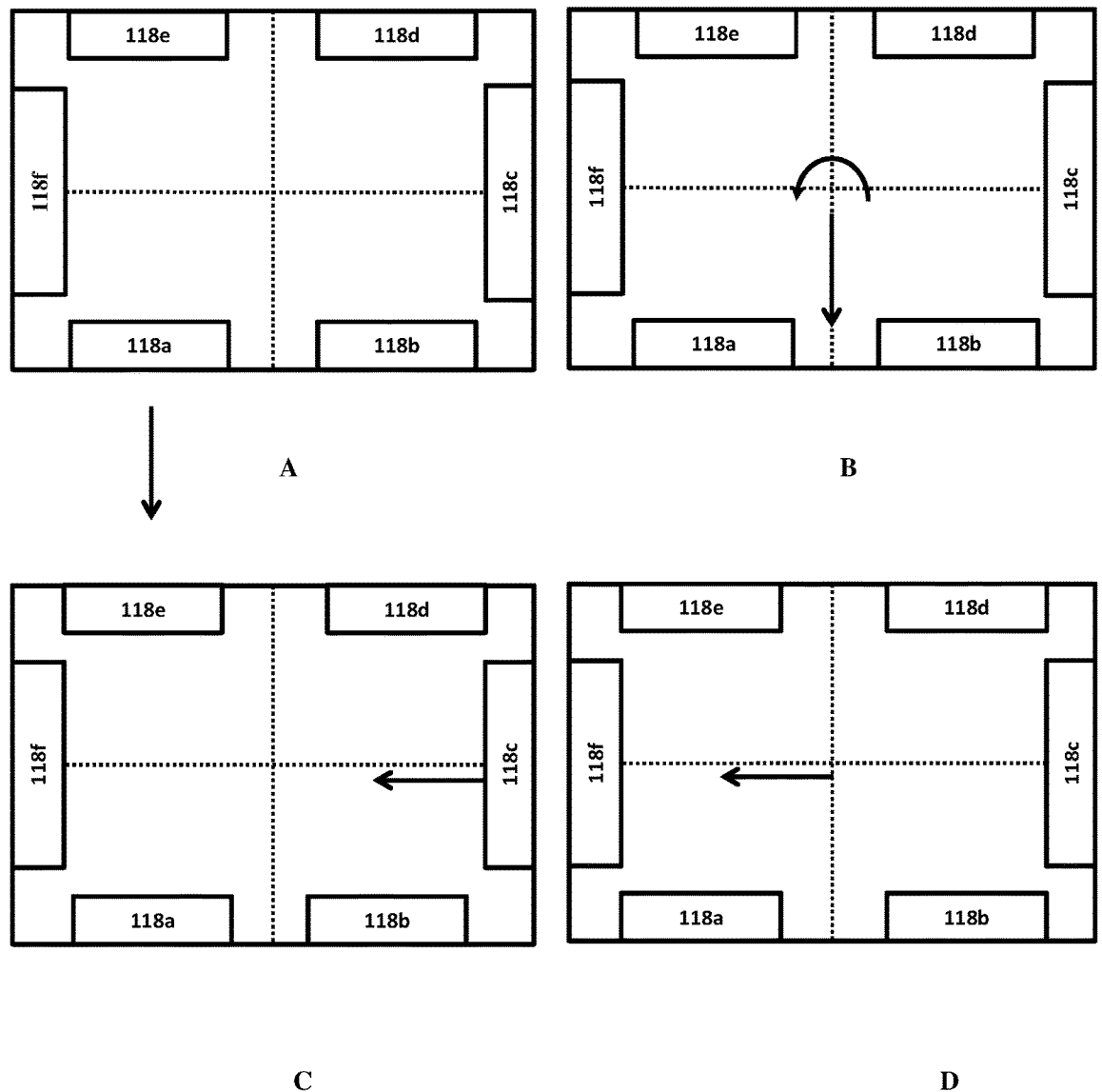
FIG. 5 shows: (A) force applied on magnet 118a and (B) the equivalent center mass force and torque; (C) force applied on magnet 118c and (D) the equivalent center mass force and torque.

When an electric current is passed in coil 204a in a clockwise direction, a force is applied on this coil, which acts mostly in the positive Y direction. For a coil with 24 turns, and 100 mA, separated by 100 um from magnet 118a above it, the force is equal to about 0.0055N (0.55 gram-force). FIG. 5 shows in (A) the force on magnet 118a and (B) the reaction to this force on the center of mass of the dual AF-actuation assembly. The force on magnet 118a is transferred in two parts when applied on the mass center: (1) a net force of 0.0055N in the negative Y direction will be applied on magnet 118a and thus on all elements attached to it rigidly in the X-Y plane, i.e. on the dual AF-actuation assembly; (2) since the magnet is not positioned in the center of mass of the dual AF-actuation assembly, an angular torque of 0.022N-mm will be generated around the Z axis in a counter-clockwise direction.

Similarly, when an electric current is passed under similar conditions in coil 204d in a clockwise direction, a 0.0055N force is applied on this coil, which acts mostly in the positive Y direction. This force applies a force of 0.0055N in the negative Y direction on magnet 118d and in turn on the dual AF-actuation assembly, and torque of 0.022N-mm around the Z axis in a clockwise direction. In the same manner, when an electric current is passed in coils 204b and 204e in a counter-clockwise direction, a force is applied on these coils, which acts mostly in the positive Y direction. As a reaction to these forces, a net force in the negative Y direction will be applied on magnets 118b and 118e, respectively. Thus, for similar coils and applied currents, a net force of 0.055N in the negative Y is applied by each magnet on the dual AF-actuation assembly, and torques of 0.022N-mm in the clockwise and counter-clockwise directions are applied by magnets 118b and 118e respectively.

When an electric current is passed in coils 204c and 204f in a clockwise direction, a force is applied on each coil, the force acting mostly in the positive X direction. As a result, a net force in the negative X direction will be applied on magnets 118c and 118f. FIG. 5 shows in (C) the force on magnets 118c and (D) the reaction of this force on the center of mass of the dual AF-actuation assembly. The force on magnet 118c is transferred in two parts when applied on the mass center: (1) a net force in the negative X direction on the center of mass of the dual AF-actuation assembly; (2) since the force in the X direction acting magnet 118c is balanced around the center of rotation, no torque will be created.

Motion Control in the X-Y Plane

Hall sensor 206a is positioned below magnet 118g, which has poles oriented along the X axis. Thus, this sensor may measure changes in the magnetic field caused by motion in the X direction. Hall sensors 206b and 206c are positioned respectively below magnets 118b and 118e, which have poles oriented along the Y axis. Thus, these sensors may measure changes in the magnetic field caused by motion in the Y direction. If the motion is only in the X or the Y direction, or in any combined direction of the two, measurements of Hall-bar sensors 206b and 206c should be equal. However, if any roll-around-Z-axis motion occurs, since Hall-bar sensors 206b and 206c are positioned along the diagonal of a rectangle, the measurement in these sensors should vary. That is, the roll-around-Z-axis motion can be detected, looking at the difference between the measurements of Hall-bar sensors 206b and 206c.

Using a combination of the six coils 118a-e can create force in the X-Y plane and torque around the Z axis such that the desired motion is achieved, namely creation of X-Y motion as needed for OIS and removal of any unwanted Z-axis-roll.

In summary, the magnet arrangements disclosed herein and their methods of use advantageously allow increasing the proximity of adjacent VCMs, providing savings of at least a width of a magnet+two mechanical shields+a magnetic shield greater than 1.5 mm (out of ~10 mm). Each reduction of 1 mm in the separation of VCMs can reduce computational time by ~10%.

Simplified Camera with Unified AF

Figure 6A:
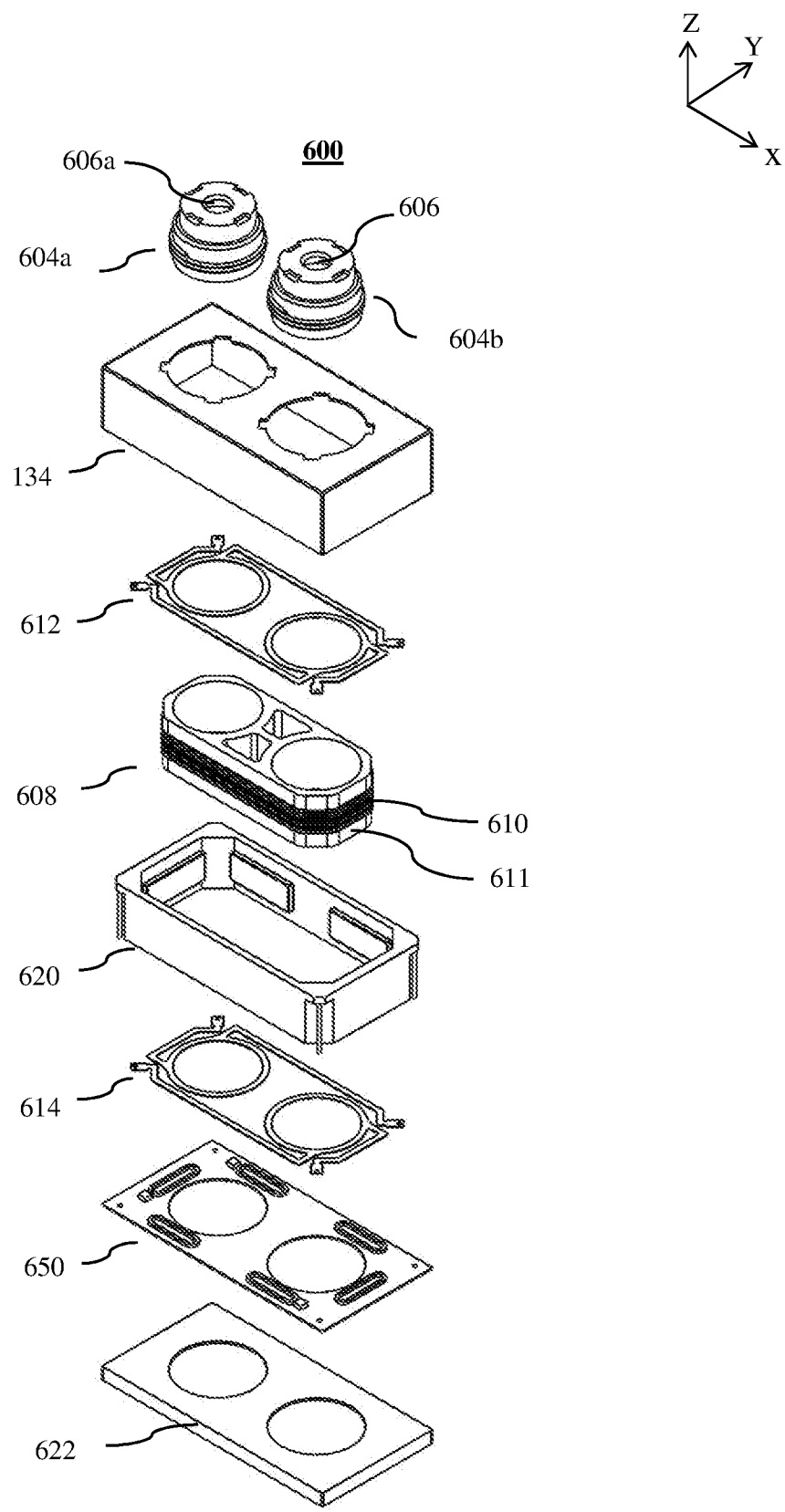
FIG. 6A shows schematically an exploded view of another embodiment of a dual-optical module camera having a single VCM with a combined AF+OIS actuator.
Figure 6B:
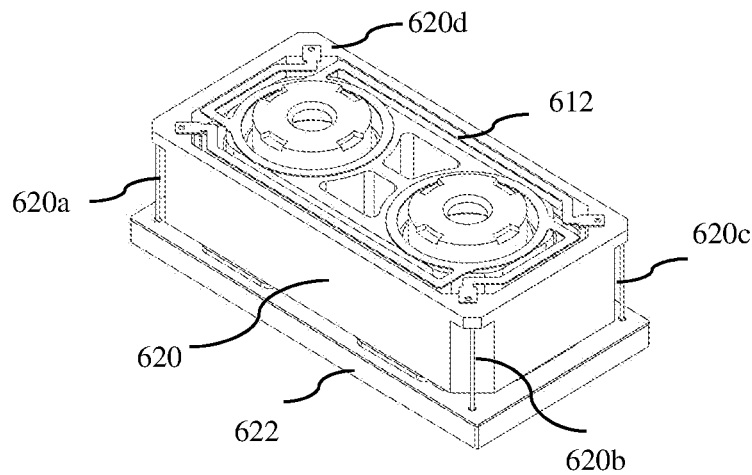
FIG. 6B shows the camera of FIG. 6A in an isometric view.
Figure 6C:
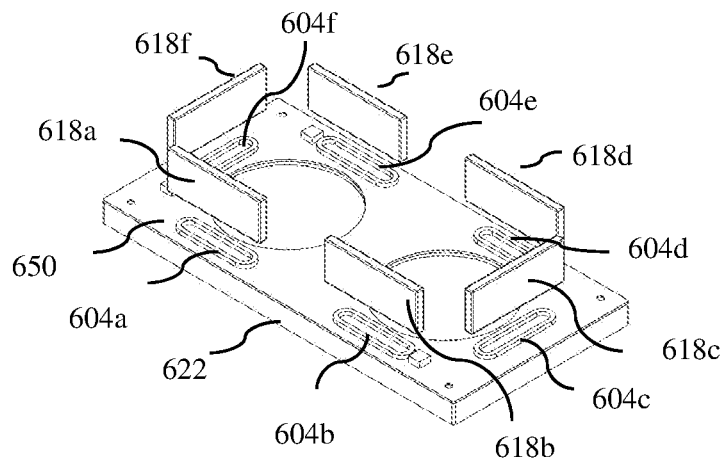
FIG. 6C shows an isometric view of a magnet set embodiment of six magnets in the camera of FIG. 6B.
Figure 6D:
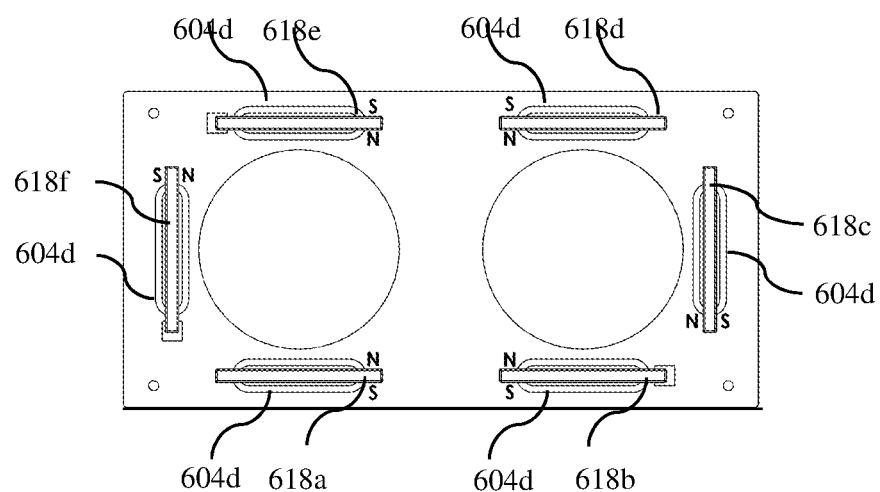
FIG. 6D shows a top view of the six magnets of the embodiment in FIG. 6C and associated pole directions.
Figure 6E:
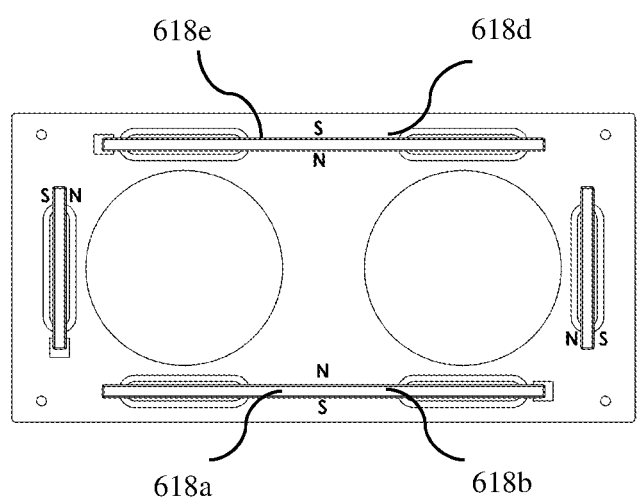
FIG. 6E shows a top view of another magnet set embodiment with four magnets and associated pole directions in a camera embodiment as in FIG. 6A.

FIG. 6A shows schematically an exploded view of embodiment 600 of a dual-optical module camera having a single VCM with a combined AF+OIS actuator. FIG. 6B shows camera 600 in an isometric view. FIG. 6C shows an isometric view of a magnet set embodiment with six magnets. FIG. 6D shows a top view of six coils under the six magnets. FIG. 6E shows a top view of an embodiment with six coils under four magnets.

Camera 600 is similar to camera 200 and includes similar components, except for a single AF-actuation assembly for performing simultaneous (in unison) auto-focusing of the two lenses (instead of the two AF actuation sub-assemblies 102a and 102b in camera 200 that perform separate auto-focusing on each lens). Camera 600 further includes a single OIS mechanism. Camera 600 is suited for the cases in which the two lens modules are identical, or at least have equal focal length, which allows focusing to the same distance.

Camera 600 includes two optical lens modules, respectively 604a and 604b, each lens module including a lens element, respectively 606a and 606b, optically coupled to a respective image sensor (not shown). Each lens module may have dimensions as follows: a diameter in the range 6-7 mm, a height of about 4 mm and a fixed focal length in the range of 4-8 mm. The two lens barrels are identical in their focal length and may be completely identical or different in some aspects such as diameter or F #. The two lens barrels are housed in a single lens carrier 608. The lens carrier is typically made of a plastic material. The lens carrier has a coil 610 wound around at least part of an external lens carrier surface 611. The coil is typically made from copper wire coated by a thin plastic layer (coating) having inner/outer diameters of respectively in the range of 50-60 μm, with several tens of turns. such that the total resistance is typically on the order of 10-30 ohms.

The AF actuation sub-assembly further includes a spring set 602, including two (upper and lower) springs, 612 and 614. Springs 612 and 614 may be identical, as shown in this embodiment. In other embodiments, they may vary in shape, spring constants, dimensions and materials. The set of springs acts a single linear rail that suspends the AF actuation sub-assembly. The linear rail is typically flexible in one direction of motion, namely along the Z axis (optical axis of the suspended lens), with a typical stiffness of 20-40 N/m, and is very stiff along the other two axes of motion, namely in the X-Y plane (or perpendicular to the optical axis of the suspended lens), with a typical stiffness >500 N/m.

Camera 600 further includes a set of six magnets (numbered 618a-f), all housed (glued) in a single plastic or metallic "housing" frame 620. Magnets 618a-f may all be identical, as in this embodiment. In other embodiments, they may vary in shape, magnetic field, dimensions and materials. The magnets arrangement is shown FIG. 6C. The spring sets of the AF actuation sub-assembly are hung on frame 620 and allow motion as described above. The AF actuation sub-assembly, the housing frame and the six magnets form a single AF-actuation assembly. Housing frame 620 is suspended on a suspension spring system comprising four round springs 620a, 620b, 620c and 620d (FIG. 6B), which may be similar to springs 220a-d above. The AF actuation sub-assembly and the four springs form a combined AF+OIS actuation assembly. Camera 600 further includes OIS motion coils 604a-f positioned on a PCB 650 glued on base 622. Coils 604a-f are positioned under respective magnets 618a-f and apply a Lorentz force on the respective magnets. Camera 600 further includes sensing elements (e.g. Hall bars) 606a-c (FIG. 6C) that can measure a magnetic field and indicate the position of the combined AF+OIS actuation assembly in X-Y plane. Such a motion in the X-Y plane allows performance of OIS, by compensating for hand movements that shift and tilt the camera module with respect to the object to be captured, as known in the art.

Coils 604a-f may be operated in various actuation modes. In some such actuation modes, currents are directed through only some of the coils. In some such actuation modes, current are directed through all of the coils. In all modes of operation there is a complete decoupling between different modes of motion, namely between each of the two Z-direction motions of the two lenses relative to frame 620 and the X-Y motion of frame 620 relative to the base.

FIG. 6F shows a top view of another magnet set embodiment in which magnets 618a+618b and 618d+618e are joined (e.g. sintered) essentially reducing the number of magnets from six to four.

The operation of AF and OIS mechanisms in camera 600 is essentially similar to those described for cameras 100 and 200, both mechanically and magnetically.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. An imaging device comprising:
   a) a first lens module having a first optical axis;
   b) a second lens module having a second optical axis parallel to the first optical axis;
   c) a lens carrier housing the first and second lens modules, the lens carrier having an external carrier surface with a coil wound around at least part of the external carrier surface;
   d) a plurality of magnets surrounding the coil; and
   e) a housing frame for housing the plurality of magnets, the housing frame hung by springs above a board having attached thereto a plurality of optical image stabilization (OIS) coils, each OIS coil associated with at least one of the magnets,
      wherein the housing frame is movable relative to the board in a plane substantially perpendicular to both optical axes as a result of magnetic forces developing between at least some of the coils and their associated magnets when a current is passed in respective OIS coils, and wherein each lens module has a fixed focal length in the range of 4-8 mm.

2. The imaging device of claim 1, wherein the plurality of magnets includes four to six magnets.

3. The imaging device of claim 1, wherein each lens module has a diameter in the range 6-7 mm.

4. The imaging device of claim 1, wherein each lens module has a height of about 4 mm.

5. A smartphone comprising the imaging device of claim 1.

6. An imaging device comprising:
   a) a first lens module having a first optical axis;
   b) a second lens module having a second optical axis parallel to the first optical axis;
   c) a lens carrier housing the first and second lens modules, the lens carrier having an external carrier surface with a coil wound around at least part of the external carrier surface;
   d) a plurality of magnets surrounding the coil;
   e) a housing frame for housing the plurality of magnets, the housing frame hung by springs above a board having attached thereto a plurality of optical image stabilization (OIS) coils, each OIS coil associated with at least one of the magnets; and
   f) a position sensing mechanism for sensing motion in two directions in a plane perpendicular to the first and second optical axes, the position sensing in one direction being independent of the position sensing in the other direction;
      wherein the housing frame is movable relative to the board in a plane substantially perpendicular to both optical axes as a result of magnetic forces developing between at least some of the coils and their associated magnets when a current is passed in respective OIS coils, and wherein the first and second lens modules are configured to undergo simultaneous auto-focusing operations.

7. The imaging device of claim 6, wherein the position sensing mechanism includes at least one Hall bar.

8. The imaging device of claim 7, further comprising a roll motion sensing mechanism for sensing a roll motion around an optical axis.

9. The imaging device of claim 8, wherein the roll motion sensing mechanism includes at least one Hall bar.

10. A method, comprising:
    a) providing an imaging device comprising:
       i. a first lens module having a first optical axis,
       ii. a second lens module having a second optical axis parallel to the first optical axis,
       iii. a lens carrier housing the first and second lens modules, the lens carrier having an external carrier surface with a coil wound around at least part of the external carrier surface,
       iv. a plurality of magnets surrounding the coil, and
       v. a housing frame for housing the plurality of magnets, the housing frame hung by springs above a board having attached thereto a plurality of optical image stabilization (OIS) coils, each OIS coil associated with at least one of the magnets;
    b) moving the housing frame relative to the board for OIS in a plane substantially perpendicular to both optical axes; and
    c) simultaneously moving the first and second lens modules for auto-focusing along their respective optical axes.

* * * * *